(12) United States Patent
Choksi

(10) Patent No.: US 7,171,216 B1
(45) Date of Patent: Jan. 30, 2007

(54) METHOD AND SYSTEM FOR DETECTING A PREFERRED WIRELESS NETWORK FOR A MOBILE DEVICE

(75) Inventor: Ojas T Choksi, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 725 days.

(21) Appl. No.: 09/839,832

(22) Filed: Apr. 19, 2001

(51) Int. Cl.
*H04Q 7/20* (2006.01)

(52) U.S. Cl. .................. 455/456.1; 4/434; 4/456.6; 4/422.1; 4/403; 4/435.1; 4/435.2; 4/444

(58) Field of Classification Search ............ 455/432.1, 455/434, 436, 437, 438, 439, 440, 441, 442, 455/443, 444, 445, 550.1, 552.1, 403, 414.1, 455/414.2, 414.3, 422.1, 426.1, 435.1, 435.2, 455/435.3, 456.1, 447, 500, 517, 551, 456.7, 455/456.3, 456.4, 456.5, 456.6, 457, 515
See application file for complete search history.

(56) References Cited

U.S. PATENT DOCUMENTS

| | | | |
|---|---|---|---|
| 5,613,199 A * | 3/1997 | Yahagi | 455/426.1 |
| 6,115,582 A * | 9/2000 | Ishida | 340/7.42 |
| 6,115,608 A | 9/2000 | Duran et al. | 455/436 |
| 6,132,306 A | 10/2000 | Trompower | 453/11.1 |
| 6,167,268 A * | 12/2000 | Souissi et al. | 455/434 |
| 6,243,577 B1 | 6/2001 | Elrefaie et al. | 455/426 |
| 6,246,875 B1 * | 6/2001 | Seazholtz et al. | 455/432.1 |
| 6,278,877 B1 * | 8/2001 | Brederveld et al. | 455/434 |
| 6,327,245 B1 | 12/2001 | Satyanarayana et al. | 370/229 |
| 6,370,157 B1 | 4/2002 | Boccuzzi et al. | 370/482 |
| 6,496,696 B1 | 12/2002 | Melnik | 455/446 |
| 6,529,491 B1 * | 3/2003 | Chang et al. | 370/335 |
| 6,574,453 B1 | 6/2003 | Honda et al. | 455/11.1 |
| 2002/0102974 A1 * | 8/2002 | Raith | 455/434 |
| 2005/0101333 A1 * | 5/2005 | Raith | 455/456.1 |

* cited by examiner

*Primary Examiner*—Keith Ferguson
(74) *Attorney, Agent, or Firm*—Baker Botts L.L.P.

(57) ABSTRACT

A method and system for detecting a wireless network includes receiving at a mobile device a signal having data indicative of a location of the mobile device. A determination is made whether the mobile device is within the coverage area of a specified network based on the data. The mobile device scans for the specified network in response to at least determining that it is within the coverage area of the specified network.

46 Claims, 3 Drawing Sheets

METHOD AND SYSTEM FOR DETECTING A PREFERRED WIRELESS NETWORK FOR A MOBILE DEVICE

TECHNICAL FIELD OF THE INVENTION

The present invention relates generally to the field of wireless communications, and more particularly to a method and system for detecting a preferred wireless network for a mobile device.

BACKGROUND OF THE INVENTION

Traditional wireless networks include a number of base stations (BTSs) in one or more mobile switching centers (MSCs). The BTSs each cover a geographic region, or cell of the wireless network and communicate with mobile telephones in the cell over a wireless link. The MSCs provide switch and soft handoff functionality for the wireless network. The wireless link may be based on established standards such as IS-54 (TDMA), IS-95 (CDMA), GMS and AMPS, 802.11 based WLAN, new upcoming standards such as CDMA 2000 and W-CDMA or proprietary radio interfaces.

Wireless networks include macro networks covering large geographic regions and smaller wireless campus networks covering a specific structure such as an office building or a set of related structures such as a corporate campus within a defined area. Campus networks often overlay one or more macro networks and provide corporate and other subscribers with preferential rate or services as compared to the macro network. Accordingly, a mobile device subscribing to the campus network will when activated camp onto the macro network only when the device is outside the coverage area of the campus network or otherwise unable to camp onto the campus network.

During operation, as the mobile device roams, it scans and selects networks based on signal strength. This ensures maximum call quality and allows for efficient handoff between cell sites and wireless networks. However, no accounting is made for network preference in areas of overlapping coverage.

SUMMARY OF THE INVENTION

The present invention provides a method and a system for detecting a preferred wireless network for a mobile device that substantially eliminates or reduces problems and disadvantages associated with the previous systems and methods. In particular, the mobile device determines when it is in and/or has entered the coverage area of a preferred network, scans for the network and camps onto the network if available.

In accordance with one embodiment of the present invention, a method and system for detecting a wireless network includes receiving at a mobile device a signal having data indicative of a location of the mobile device. A determination is made whether the mobile device is within the coverage area of a specified network based on the data. The mobile device scans for the specified network in response to at least determining that it is within the coverage area of the specified network.

More specifically, in accordance with a particular embodiment of the present invention, the signal is a base station broadcast message having one or more base station identifiers with geolocation information. In this embodiment, each base station identifier is extracted from the broadcast message and compared to a listing of base station identifiers for, in, or in the vicinity of the specified network. The mobile device scans for the specified network in response to at least one of the base station identifiers from the broadcast message matching one of the listed base station identifiers.

In accordance with another embodiment of the present invention, the signal is a global positioning satellite (GPS) signal. In this embodiment, a location of the mobile device is determined based on the GPS signal and compared to the coverage area of the specified network. The mobile device scans for the specified network in response to at least the mobile device being within the coverage area of the specified network.

Technical advantages of the present invention include providing a method and system for detecting a preferred wireless network for a mobile device. In a particular embodiment, the mobile device determines when it is in and/or has entered the coverage area of the preferred network and scans for the preferred network. If the preferred network is available, the mobile device camps onto the network. As a result, the mobile device maximizes utilization of the preferred network and its benefits.

Another technical advantage of one or more embodiments of the present invention includes providing a method and system for transparent network selection and mobility across preferred and overlying macro networks. In particular, mobile devices utilize location-based and/or location-indicative information to determine networks covering their location as they roam and select between the available networks. As a result, mobile devices will automatically detect and camp onto preferred networks when available.

Still another technical advantage of one or more embodiments of the present invention includes providing a method and system for detecting the coverage area of a preferred network by mobile devices. In particular, a mobile device utilizes broadcast overhead messages from the wireless network or available geographical location information to detect when it has entered the coverage area of a preferred network at which point the mobile device then initiates a scan for the preferred network. Accordingly, unnecessary scanning for the preferred network throughout a macro network is eliminated which reduces wireless traffic and maximizes battery life of the mobile device. In addition, changes to the macro network to support network selection and mobility are minimized.

Other technical advantages of the present invention will be readily apparent to one skilled in the art from the following figures, description and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
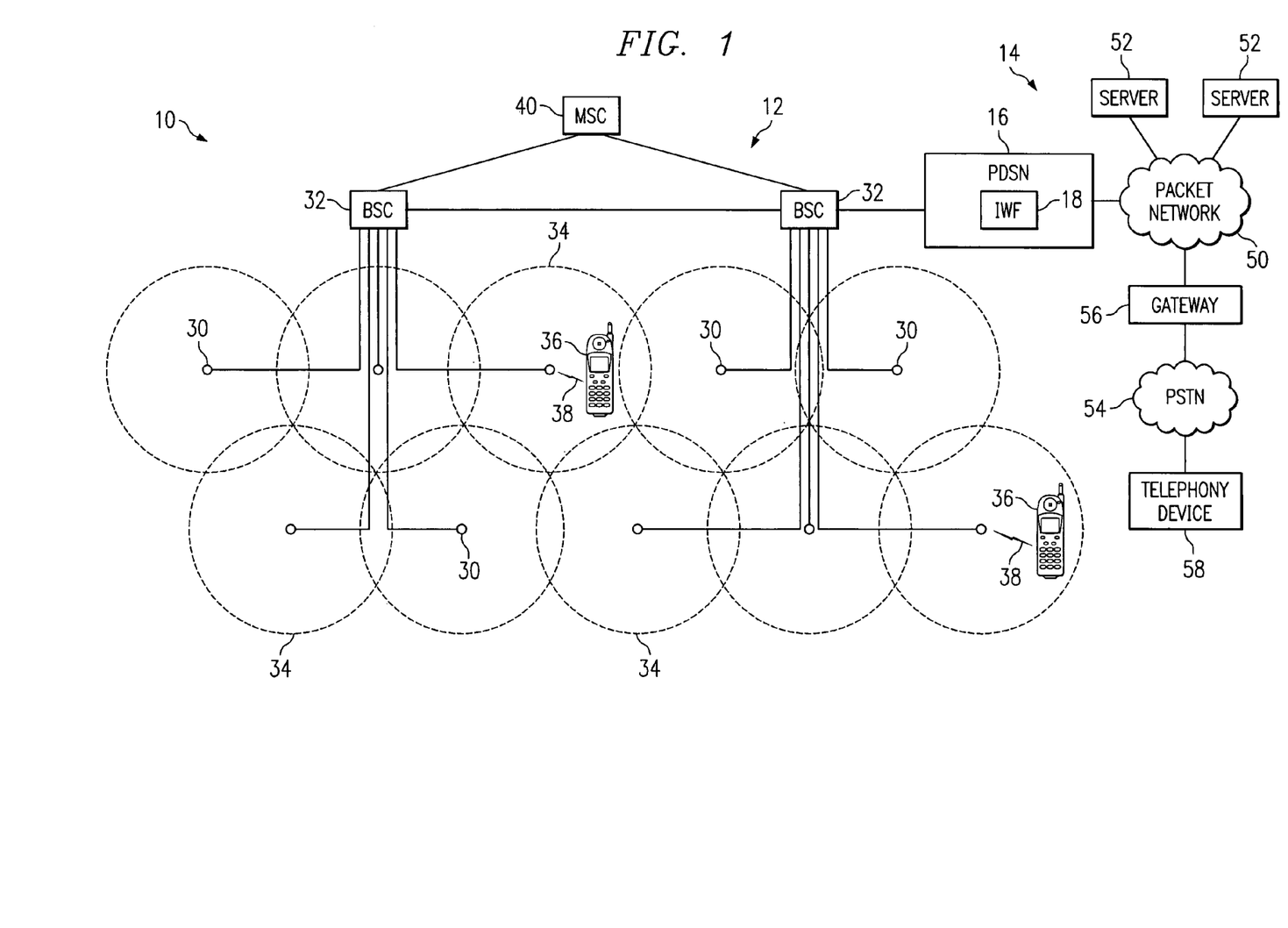
FIG. 1 is a block diagram illustrating a communications network in accordance with one embodiment of the present invention.

FIG. 1 illustrates a communications system 10 in accordance with one embodiment of the present invention. In this embodiment, the communications system 10 includes a cellular wireless network in which terrestrial wireless transmissions originate in geographically delimited cells. It will be understood that the present invention may be used in connection with other suitable wireless networks.

Referring to FIG. 1, the communications system 10 includes a wireless network 12 connected to a wireline network 14 through a packet data serving node (PDSN) 16. The PDSN 16 comprises a router that directs traffic between the wireless and wireline networks 12 and 14. In one embodiment, the PDSN 16 includes a data interworking function (IWF) 18 that provides connectivity between the wireless and wireline networks 12 and 14 via circuit switched and packet switched wireless data protocols. It will be understood that connectivity between the wireline and wireless networks 12 and 14 may be otherwise suitably provided without departing from the scope of the present invention.

The wireless network 12 includes a number of base stations (BTSs) 30 connected to base station controllers (BSCs) 32. The BTSs 30 each cover a geographic region, or cell 34 of the wireless network 12 and communicate with mobile devices 36 in the cell 34. The mobile devices 36 may be cell phones, data phones, portable data devices, portable computers, handheld devices, handsets, portable network appliances or other suitable devices capable of communicating information over a wireless link 38.

The BSCs 32 are connected to each other, to the PDSN 16 and to a mobile switching center (MSC) 40. The BSCs 32 and the MSC 40 provide switch and soft handoff functionality for the wireless network 12. In this way, voice, video, data and other information is routed to and from the mobile devices 36 and connections are maintained with the mobile devices 36 as they move throughout, or roam the wireless network 12.

Wireless link 38 is a radio frequency (RF) link. The wireless link 38 may be based on established technologies or standards such as IS-54 (TDMA), IS-95 (CDMA), GSM and AMPS, 802.11 based WLAN, or more recent technology such as CDMA 2000 and W-CDMA or proprietary radio interfaces. In a particular embodiment, wireless link 38 comprises a code division multiple access (CDMA) link based on a CDMA standard and in which packets are segmented into radio frames for transmission over the wireless interface and reassembled by the receiving device to reconstitute the packets.

The wireline network 14 includes a packet or other suitable data network 50 connecting a number of servers 52 to each other and to the PDSN 16. The packet network 50 also connects the PDSN 16, and thus the wireless network 12 to the public switched telephone network (PSTN) 54 through gateway 56. Accordingly, mobile devices 36 may communicate through wireless network 12, packet network 50 and PSTN 54 with standard telephones, clients and computers using modems or digital subscriber line (DSL) connections or other telephony devices 58.

The data network 50 may be the Internet, intranet, extranet, or other suitable local or wide area network capable of communicating information between remote endpoints. For the Internet embodiment, information is transmitted in Internet protocol (IP) packets using transport control protocol/Internet protocol (TCP/IP). It will be understood that information may be transmitted in other suitable packets, including asynchronous transport mode (ATM) and other cells or datagrams.

The servers 52 may comprise voicemail servers (VMS), fax/modem servers, short message center (SMSC) servers, conferencing facilities, authentication, authorization, and accounting (AAA) servers, billing servers, home location registers (HLR), home subscriber servers (HSS), domain name servers (DNS) and other suitable servers and functionality providing services to mobile devices 36 and/or to wireless and/or wireline connections in the communications system 10.

The servers 52 and/or other elements of the wireless or wireline networks 12 and 14 store subscriber level information for users of the wireless and/or wireline networks 12 and 14. The service level information includes service, quality and/or service level agreement (SLA) parameters for user connections as well as rate and other subscription information. In a particular embodiment, the BSCs 32 store or access SLA databases including a QoS policy and rate information for each user. The QoS identifies a class of service (CoS) for user connections, such as drops, delays, jitters and other limits for the user connections. It will be understood that subscription level information may be otherwise stored and/or accessed for call set up and mobility processing by the communications network 10.

Figure 2:
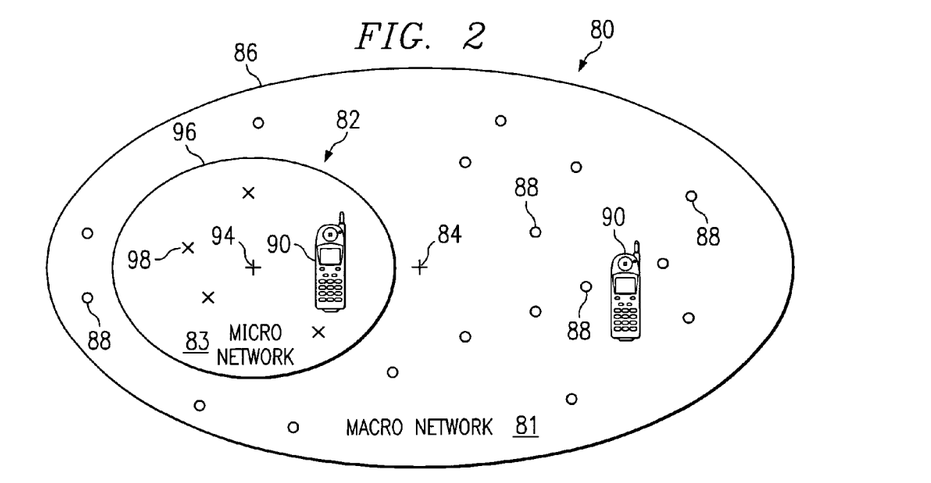
FIG. 2 is a block diagram illustrating a macro wireless network overlying a micro wireless network in accordance with one embodiment of the present invention.

FIG. 2 illustrates a plurality of overlapping wireless networks in accordance with one embodiment of the present invention. In this embodiment, a macro wireless network 80 covers a large geographic area 81 and overlays a micro network 82 covering a small geographic area 83, which may include a structure or a set of structures such as an office building, office park, travel port or corporate campus.

The macro network 80 includes a center 84 and a periphery 86 defining the shape and dimensions of the coverage area 81. Within the coverage area 81, the macro network 80 includes a plurality of evenly or otherwise suitably spaced BTSs 88 for communicating over a wireless link with mobile devices 90. As the mobile devices 90 move in, or traverse, in the macro network 80, calls are handed off between BTSs 88.

The micro network 82 includes a center 94 and a periphery 96 defining the shape and dimensions of the coverage area 83. Within the coverage area 83, the micro network 82 includes one or more evenly or otherwise suitably spaced base stations 98 for communication with mobile devices 90. In an office building, for example, each floor or other section of the building may include a BTS 98 or network of BTSs 98. As the mobile devices 90 move in, or traverse, the micro network 82, calls are handed off between BTSs 98.

The micro network 82 is a preferred network for subscribing mobile devices 90 in that the devices are programmed to camp onto the network 82 if available and otherwise to camp onto the overlying macro network 80. The micro network 82 may be preferred because it provides subscribers with reduced rates or enhanced services as compared to the macro or other overlapping network 80. For example, subscribers may receive guaranteed bandwidth, higher quality of service (QoS) and/or class of service (CoS) and/or be charged less for calls connected over preferred network 82. The calls may comprise video, voice, data, combinational and any other suitable type of information.

In operation, when a mobile device 90 is activated, it scans for available networks 80 and/or 82 and camps onto the preferred network 82 if available. Otherwise, the mobile device 90 camps onto the macro network 80. Thus, if the mobile device 90 is activated outside of the preferred network 82, it camps onto the macro network 80 and calls are connected through that network 80 and provided at the rates and service level agreed on for use of the network 80. When the mobile device 90 enters the preferred network 82, the mobile device 90 detects that it is within the coverage area 83 of the network 82, scans for the network 82 and camps onto the network 82 if available. The mobile device 90 may camp on independent of signal strength of the macro and/or preferred networks 80 and 82 or may require a minimal signal strength for decoding and/or other quality control. The mobile device 90 may continue to attempt to camp onto the preferred network 82 while within the coverage area 83 of the network 82. When the mobile device 90 leaves the coverage area 83 of the preferred network 82, it switches to the macro network 80 based on detecting that it is outside the coverage area of the preferred network 82, based on a decline of signal strength below a specified decoding threshold from the preferred network 82 or by other suitable methods.

As described in more detail below, the mobile device 90 uses data indicative of location of the mobile device 90 to determine its presence and/or entry into the coverage area 83 of the preferred network 82. The data comprises header, payload or other suitable bits, bytes or data words in a signal. This signal is a broadcast, multicast, unicast or other suitable signal. The data is indicative of the location of the mobile device 90 if it includes the location of the device, which may be an approximation, includes information from which the location of the device can be determined or includes information on the location of a disparate device known to be proximate to the mobile device 90, such as in a same or neighboring cell, by communication between the devices or other suitable means.

In one embodiment, the signal is a BTS broadcast message. In this embodiment, the data may comprise an identifier or the latitude and longitude of the BTS broadcasting the message. In another embodiment, the data may comprise one or more identifiers of neighboring BTSs and their associated radio technology with discovered by the broadcasting BTS using radio discovery. In still another embodiment, the signal comprises a global positioning satellite (GPS) signal. In this embodiment, the data comprises the information from which the location of the mobile device 90 can be determined. In these and other suitable embodiments, the presence and/or entry of the mobile device 90 into the coverage area 83 of the preferred network 82 is detected by matching the data or information based on the data to coverage data for the preferred network 82 corresponding in type to the data indicative of location. Thus, for example, a BTS identifier retrieved from a broadcast message may be compared to a listing of BTS identifiers of the macro network BTSs 88 in close proximity and/or overlaying to the coverage area 83 of the micro network 82 and/or BTS identifiers of the preferred network 82. The latitude and longitude of the BTS and/or mobile device 90 may alternatively be compared to the geographic coverage area of the preferred network 82.

Figure 3:
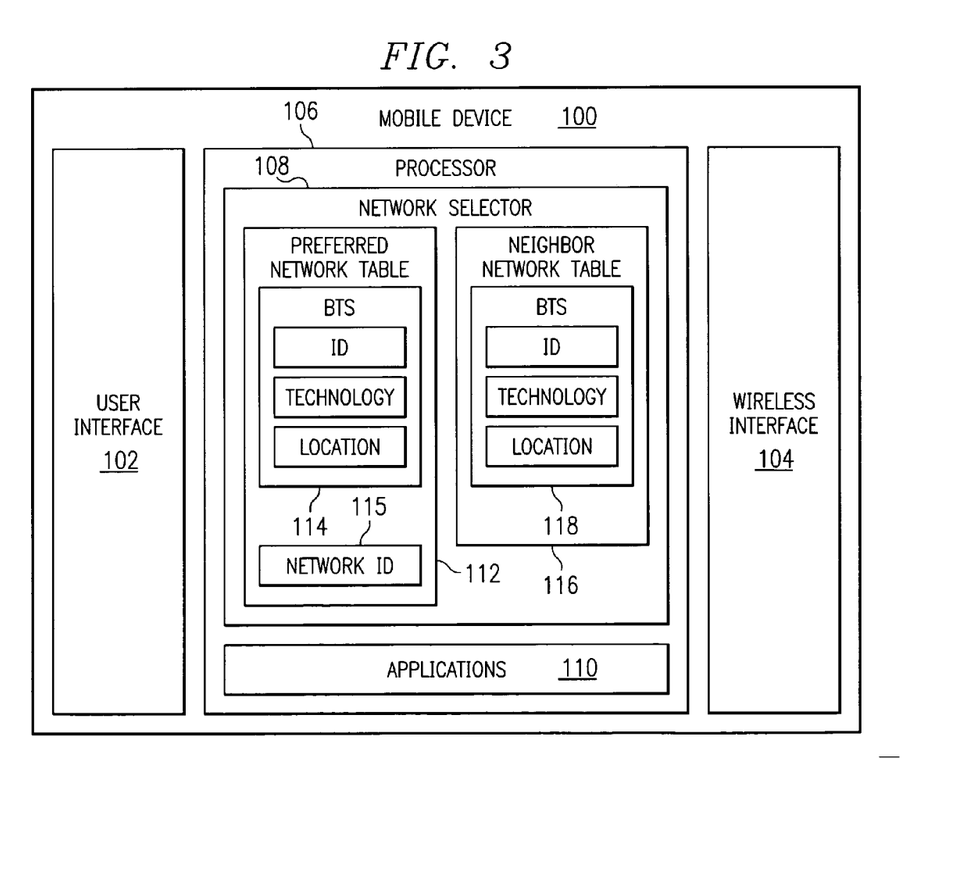
FIG. 3 is a block diagram illustrating the mobile device of FIG. 1 in accordance with one embodiment of the present invention.

FIG. 3 illustrates details of a mobile device 100 in accordance with one embodiment of the present invention. In this embodiment, mobile device 100 utilizes BTS identifiers to detect its presence and/or entry into the preferred network 82. The mobile device 100 is a multiple frequency handset capable of communicating data over a plurality of wireless networks. It will be understood that the mobile device 100 may be any suitable device capable of communicating with disparate networks.

Referring to FIG. 3, the mobile device 100 includes a user interface 102, a wireless interface 104, and a processor 106. The user interface 102 comprises keyboard, touch screen, tracking devices and/or microphones for receiving user input and video display and/or audio speaker for providing output to the user. It will be understood that the user interface 102 may comprise other or disparate input/output devices for communicating with the user and/or other suitable entity.

The wireless interface 104 comprises multiple or multi-frequency transceivers for transmitting and receiving information over wireless links. The wireless interface 104 may include queuing and control mechanisms for managing the transmission and reception of wireless traffic.

The processor 106 executes logic encoded in media for implementing the functionality of the mobile device 100. It will be understood that other components of the communication system 10 may also comprise logic encoded in media for implementing functionality of the device or system. The logic comprises functional instructions for carrying out the program task. The media comprises computer disks or other computer-readable media, application specific integrated circuits (ASIC), field programmable gate arrays (FPGA), digital signal processors (DSP), other suitable specific or general purpose processors, transmission media or other suitable media in which logic may be encoded and utilized.

In one embodiment, the processor 106 includes a network selector 108 and applications 110. The applications 110 may comprise telephony, video on demand, web browser applications and other suitable applications. The network selector 108 detects, scans for and camps onto an available network when the mobile device 100 is first activated and onto the preferred network 82 when the mobile device 100 is present or enters the coverage area 83 of the network 82.

The network selector 108 includes a preferred network table 112 comprising BTS identifiers 114 for all or other suitable sets of BTSs 98 in the preferred network 82. A neighboring network table 116 comprises BTS identifiers 118 for all or other suitable set of BTSs 88 whose coverage overlap and/or is proximate with that of the preferred network 82. In this embodiment, network selector 108 may determine if it is proximate to or within the coverage area 83 of the preferred network 82 based on identifiers of BTSs in the macro network 80 onto which the mobile device 100 is locked or identifiers of neighboring BTSs in the preferred network 82 discovered and transmitted by BTSs in the macro network 80 onto which the mobile device 100 is locked. The BTS identifiers 114 and 118 may comprise a BTS ID, a geolocation of the cell and/or a cell technology. The preferred network table 112 may also include a network ID 115 of the preferred network 82. In this embodiment, the network selector 108 may determine it is proximate to or within the coverage area 82 of the preferred network 82 based on the network ID 115 which is determined by the macro network 80 using radio discovery and broadcast by BTSs 88 of the macro network 80 neighboring the preferred network 82. A benefit to using geolocation alone or in conjunction with a corresponding technology to uniquely identify a BTS is that it is not typically subject to modification and accordingly need not be updated and/or refreshed. The preferred network and/or neighboring network tables 112 and 116 may comprise self-learning tables which are updated by the mobile device 100 based on broadcast messages received from the BTSs of the preferred network, which are themselves updated using radio discovery.

In one embodiment, radio discovery may be performed by BTSs sending out discovery messages when activated. In this embodiment, BTSs in the general area of an activated BTS and receiving the activation message respond with their identifiers. The activated BTS then determines which of the responding BTSs are neighboring BTSs based on interference, coverage area and/or proximity. The activated BTS then informs the neighboring BTSs of their status and the neighbor tables are updated in each of the affected BTSs. Neighboring networks may be similarly discovered during the radio discovery process.

As described in more detail below in connection with FIG. 4, the network selector 108 determines that the mobile device 100 is within the coverage area 83 of the preferred network 82 when it receives a BTS broadcast message including a BTS identifier matching one of the BTS identifiers 114 and/or 118 in the network tables 112 and/or 116. Accordingly, the mobile device 100 can detect that it is within the coverage area 83 of the preferred network 82 without using GPS signals and/or other mechanisms for determining the geographical location of the mobile device 100. In one embodiment, the mobile device 100 will attempt to camp on to the preferred network 82 as long as it can successfully decode the preferred network.

Figure 4:
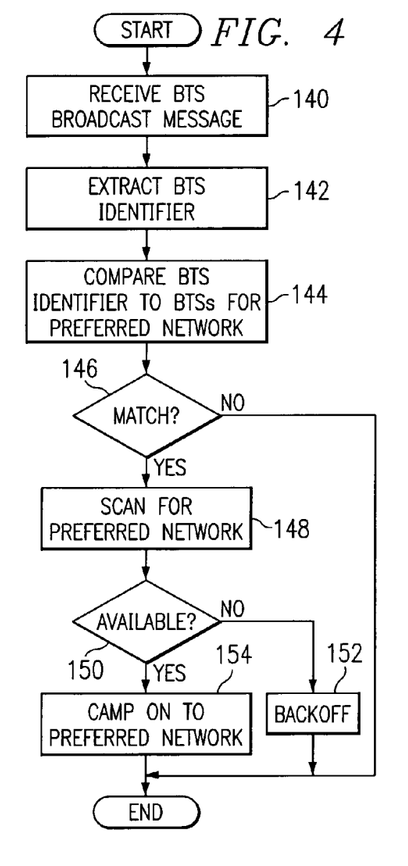
FIG. 4 is a flow diagram illustrating a method for detecting a preferred wireless network for the mobile device of FIG. 3 in accordance with one embodiment of the present invention.

FIG. 4 illustrates a method for detecting a preferred network for a mobile device in accordance with one embodiment of the present invention. In this embodiment, BTS identifiers extracted from BTS broadcast messages are utilized to detect when the mobile device 100 is present in and/or has entered the coverage area 83 of the preferred network 82. It will be understood that other suitable information within the BTS broadcast message or other messages or signals transmitted within the wireless network and having data indicative of the location of the mobile device 100 may be used for detecting the preferred network 82.

The method begins at step 140 in which a BTS broadcast message for a CDMA or other suitable network is received by the mobile device 100. The mobile device 100 may receive and process the BTS broadcast messages when in the idle or other suitable state and/or states. Next, at step 142, a BTS identifier is extracted from the overhead of the broadcast message. At step 144, the BTS identifier is compared to the BTS identifiers 118 stored in the neighboring network table 116 of the mobile device 100. The ID technology and/or geolocation of the BTS identifier may be used in the comparison.

Proceeding to decisional step 146, if the BTS identifier 118 does not match those proximate to the preferred network 82, then the BTS whose coverage area the mobile device 100 has entered is not in or overlapping the coverage area 83 of the preferred network 82 and the No branch of decisional step 146 leads to the end of the process. In this case, the mobile device 100 remains camped onto macro network 80.

If the BTS identifier extracted from the broadcast message matches one of the identifiers 118 from the neighboring network table 116, the mobile device 100 is in close proximity to a cell of the preferred network 82 and thus near the coverage area 83 of the preferred network 82. Similarly, if a BTS identifier determined by the broadcasting BTS through radio discovery and transmitted with the broadcast message matches a BTS identifier 114 in the preferred network table 112, the mobile device 100 is in close proximity to a cell of the preferred network 82 and thus near the coverage area 83 of the preferred network 82. It will be understood that a valid determination that the mobile device 100 is within the coverage area 83 of the preferred network 82 may require more than one receipt of matching BTS identifiers to account for signal bounce and other transmission irregularities. Accordingly, the Yes branch of decisional step 146 leads to step 148.

At step 148, the mobile device 100 scans for the preferred network 82. Next, at decisional step 150, the mobile device 100 determines whether the preferred network 82 is available based on results of the scan. The preferred network may not be available due to weak coverage or due to a shut down for maintenance. If a preferred network 82 is not available, the No branch of decisional step 150 leads to step 152 where the mobile device 100 backs off and does not scan for a period of time to save power. The period of the backoff may increase for successive unsuccessful attempts to camp onto the micro network 82 and may be reset when the mobile device 100 moves out of proximity to the preferred network 82, such as when the mobile device 100 receives a broadcast message that does not include an identifier in the tables, or after a specified number of scans. Step 152 leads to the end of the process and the mobile device 100 remains camped onto the macro network 80.

At decisional step 150, if the preferred network 82 is available, the Yes branch of decisional step 150 leads to step 154 where the mobile device 100 camps onto the preferred network 82. Step 154 leads to the end of the process by which the mobile device 100 detects entry into the coverage area 83 of a preferred network 82, scans for the preferred network 82 and camps onto the preferred network 82 if available. Accordingly, use of the preferred network is maximized. In addition, use of the BTS broadcast messages allows the mobile device 100 to detect entry into the preferred network 82 without continuously scanning for the network which saves battery power and lengthens the operational life of the mobile device 100 between recharges.

Figure 5:
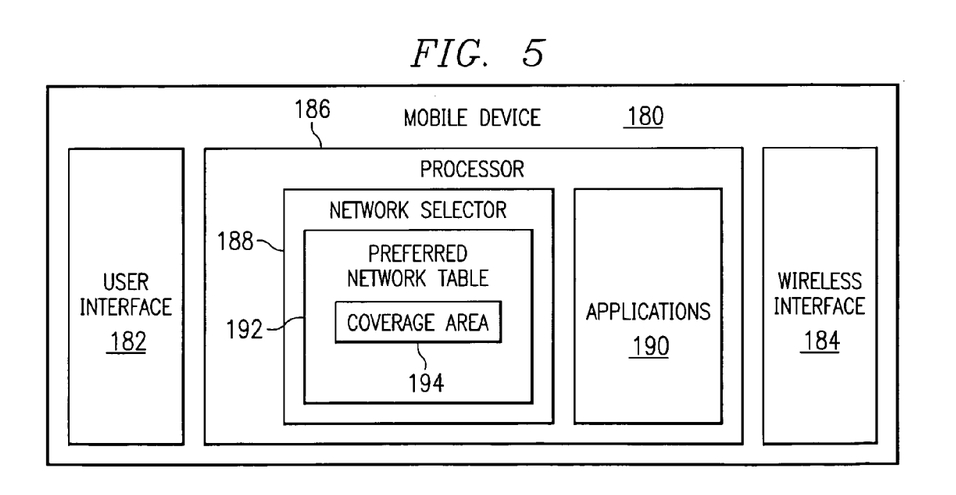
FIG. 5 is a block diagram illustrating the mobile device of FIG. 1 in accordance with another embodiment of the present invention.

FIG. 5 illustrates a mobile device 180 in accordance with another embodiment of the present invention. In this embodiment, the mobile device 180 utilizes global positioning satellite (GPS) information to detect its presence in and/or entry into the coverage area 83 of the preferred network 82. The mobile device 180 is a multiple frequency or other suitable handset capable of communicating data over a plurality of wireless networks.

Referring to FIG. 5, the mobile device 180 includes a user interface 182, a wireless interface 184 and a processor 186 as previously described in connection with the mobile device 100. The processor 186 includes a network selector 188 and applications 190 as also described in connection with the mobile device 100. The network selector 188 detects, scans for and camps onto an available network when the mobile device 180 is first activated and camps onto the preferred network 82 when the mobile device 180 is present or enters the coverage area 83 of the network 82.

The network selector 188 includes a preferred network table 192 comprising a definition 194 of the coverage area 83 of the preferred network 82. The coverage area 83 may be defined by a center, a size and a shape of the coverage area 83 or by multiple centers, sizes and shapes together forming the area. The center may be defined by a latitude and longitude while the size and shape are defined by the latitude and longitude of points along a periphery or by an equation giving the shape of the coverage area 83 about the center location. As described in more detail below in connection with FIG. 6, the network selector 188 determines that the mobile device 180 is within the coverage area 83 of the preferred network 82 when it receives a GPS signal indicating that the mobile device 180 is within the defined geographic area 94. Accordingly, the mobile device 180 can detect that it is within the coverage area 83 of the preferred network 82 without using network specific identifiers or network generated signals.

Figure 6:
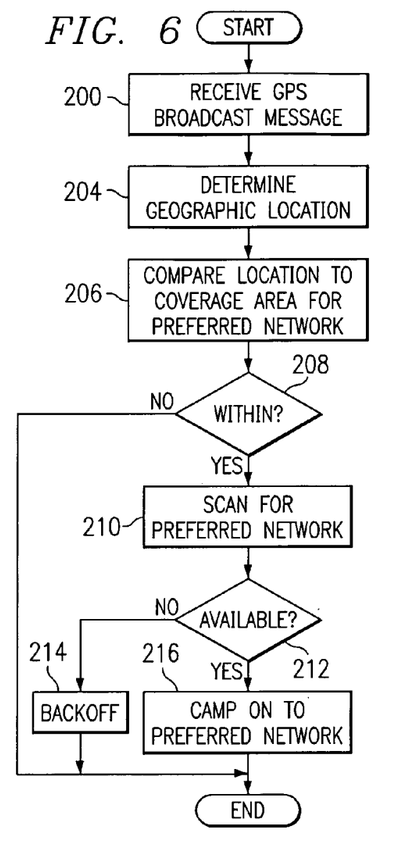
FIG. 6 is a flow diagram illustrating a method for detecting a preferred network for the mobile device of FIG. 5 in accordance with one embodiment of the present invention.

FIG. 6 illustrates a method for detecting a preferred network for a mobile device in accordance with one embodiment of the present invention. In this embodiment, GPS signals are utilized to detect when the mobile device 180 has entered the coverage area 83 of the preferred network 82. It will be understood that other suitable information from which the location of the mobile device 100 can be determined may be used for detecting the preferred network 82.

The method begins at step 200 in which a GPS broadcast message is received by the mobile device 180. The mobile device 180 may receive and process the GPS broadcast messages when in the idle or other suitable state and/or states. Next, at step 204, a location of the mobile device 180 is determined based on the GPS broadcast message. In determining its location, the mobile device 180 may utilize additional information and remote resources. At step 206, the location of the mobile device 180 is compared to the coverage area 83 for the preferred network 82 as defined in the preferred network table 192.

The defined coverage area 194 may exactly match or proximate the actual coverage area 83 of the preferred network 82. For example, the defined coverage area 194 may be slightly smaller than the actual coverage area 83 to simplify the geographical definition of the coverage area 83 and simplify the detection process. In this case, when the mobile device 180 is within the defined coverage area 194, it is inside the actual coverage area 83 and will successfully scan for the preferred network 82 and camp onto the micro network 82 if available. This eliminates unnecessary periodic scans. Thus, the coverage area used by the mobile devices 180 and 100 may be the actual, the area approximate, an estimated or other suitable coverage area.

Proceeding to decisional step 208, if the mobile device 180 is not within the defined coverage area 194 of the preferred network 82, the No branch of decisional step 208 leads to the end of the process. In this case, the mobile device 180 remains camped onto the macro network 80. If the mobile device 180 is within the defined coverage area 194 of the preferred network 82, the Yes branch leads to step 210. As previously described, a valid determination may require two or three successive or other suitable set of findings.

At step 210, the mobile device 180 scans for the preferred network 82. Next, at decisional step 212, the mobile device 180 determines whether the preferred network 82 is available based on results of the scan. If the preferred network 82 is not available, the No branch of decisional step 212 leads to step 214 where the mobile device 100 backs off and does not scan for a period of time to save power. As previously described in connection with FIG. 4, the period of the backoff may increase for successive unsuccessful attempts to camp on to the preferred network 82 and may be reset when the mobile device 100 moves out of proximity to the preferred network 82 or a specified number of tries. Step 214 leads to the end of the process and the mobile device 180 remains camped onto the macro network 80.

At decisional step 212, if the preferred network 82 is available, the Yes branch leads to step 216 where the mobile device 180 camps onto the preferred network 82. Step 216 leads to the end of the process by which the mobile device 180 detects entry into the coverage area 83 of the preferred network 82, scans for the preferred network 82, and camps onto the preferred network 82 if available. Accordingly, use of the preferred network is maximized without continuously scanning for the network.

In another embodiment, mobile device 180 may utilize latitude and longitude information transmitted in the BTS broadcast message to determine its approximate location and determine whether that location is within the coverage area of the preferred network 82. Accordingly, GPS information need not be used to determine the approximate location of the mobile device 180 and/or whether the mobile device 180 is within the coverage area of the preferred network 82.

Although the present invention has been described with several embodiments, various changes and modifications may be suggested to one skilled in the art. It is intended that the present invention encompass such changes and modifications as fall within the scope of the appended claims and their equivalents.

What is claimed is:

1. A method for detecting a wireless network, comprising:
receiving at a mobile device a signal having data indicative of a location of the mobile device;
determining whether the mobile device is within a coverage area of a specified network based on the data, wherein the specified network is overlapped by coverage from a macro network;
scanning for the specified network in response to at least determining that the mobile device is within the coverage area of the specified network, wherein a decision as to whether to scan, by the mobile device, for the specified network is based on a distance between the location of the mobile device and a location of the specified network;
determining if the specified network is available;
continuing to scan until the specified network is available or until the mobile device exits the macro network; and
camping on the specified network if signals are received from the specified network at a minimal signal strength, even if other signals are received from the macro network at a signal strength greater than the signals received from the specified network.

2. The method of claim 1, wherein the signal comprises a base station broadcast message having a base station identifier, further comprising:
extracting the base station identifier from the base station broadcast message;
comparing the base station identifier to a listing of base station identifiers for base stations at least proximate to the specified network; and
scanning for the specified network in response to at least the base station identifier from the base station broadcast message matching one of the base station identifiers in the listing of base station identifiers.

3. The method of claim 2, wherein the base station identifiers for the specified network are stored in a network table at the mobile device.

4. The method of claim 1, wherein the signal comprises a base station broadcast message having a latitude and longitude of the base station, further comprising:
extracting the latitude and longitude from the base station broadcast message;

comparing a location based on the latitude and longitude to the coverage area of the specified network; and scanning for the specified network in response to at least the location being within the coverage area of the specified network.

5. The method of claim 4, wherein the coverage area is defined at the mobile device.

6. The method of claim 5, wherein the coverage area is defined by at least a center, a shape and dimensional information for the coverage area.

7. The method of claim 1, wherein the signal comprises a global positioning satellite (GPS) signal, further comprising:
   determining a location of the mobile device based on the GPS signal;
   comparing the location of the mobile device to the coverage area of the specified network; and
   scanning for the specified network in response to at least the mobile device being within the coverage area of the specified network.

8. The method of claim 7, wherein the coverage area is defined at the mobile device.

9. The method of claim 8, wherein the coverage area is defined by at least a center, of the coverage area, a shape and dimensional information for the coverage area.

10. The method of claim 1, wherein the signal comprises a CDMA base station broadcast signal.

11. The method of claim 1, wherein the specified network comprises a preferred network for a user of the mobile device.

12. The method of claim 1, further comprising camping onto the specified network if available.

13. The method of claim 1, further comprising determining whether the mobile device is within the coverage area of the specified network based on the data indicative of location and coverage data for the specified network corresponding in type to the data indicative of location.

14. A system for detecting a wireless network, comprising:
   means for receiving at a mobile device a signal having data indicative of a location of the mobile device, wherein the specified network is overlapped by coverage from a macro network;
   means for determining whether the mobile device is within a coverage area of a specified network based on the data; and
   means for scanning for the specified network in response to at least determining that the mobile device is within the coverage area of the specified network, wherein a decision as to whether to scan, by the mobile device, for the specified network is based on a distance between the location of the mobile device and a location of the specified network;
   means for electing whether or not to camp onto the specified network;
   means for continuing to scan until the mobile device enters the specified network or until the mobile device exits the macro network and camp on the specified network if signals are received from the specified network at a minimal signal strength, even if other signals are received from the macro network at a signal strength greater than the signals received from the specified network.

15. The system of claim 14, wherein the signal comprises a base station broadcast message having a base station identifier, further comprising:
   means for extracting the base station identifier from the base station broadcast message;
   means for comparing the base station identifier to a listing of base station identifiers for base stations at least proximate to the specified network; and
   means for scanning for the specified network in response to at least the base station identifier from the base station broadcast message matching one of the base station identifiers in the listing of base station identifiers.

16. The system of claim 15, wherein the base station identifiers for the specified network are stored in a network table at the mobile device.

17. The system of claim 14, wherein the signal comprises a base station broadcast message having a latitude and longitude of the base station, further comprising:
   means for extracting the latitude and longitude from the base station broadcast message;
   means for comparing a location based on the latitude and longitude to the coverage area of the specified network; and
   means for scanning for the specified network in response to at least the location being within the coverage area of the specified network.

18. The system of claim 17, wherein the coverage area is defined at the mobile device.

19. The system of claim 18, wherein the coverage area is defined by at least a center, a shape and dimensional information for the coverage area.

20. The system of claim 14, wherein the signal comprises a global positioning satellite (GPS) signal, further comprising:
   means for determining a location of the mobile device based on the GPS signal;
   means for comparing the location of the mobile device to the coverage area of the specified network; and
   means for scanning for the specified network in response to at least the mobile device being within the coverage area of the specified network.

21. The system of claim 20, wherein the coverage area is defined at the mobile device.

22. The system of claim 21, wherein the coverage area is defined by at least a center, of the coverage area, a shape and dimensional information for the coverage area.

23. The system of claim 14, wherein the signal comprises a CDMA base station broadcast signal.

24. The system of claim 14, wherein the specified network comprises a preferred network for a user of the mobile device.

25. The system of claim 14, further comprising means for camping onto the specified network if available.

26. The system of claim 14, further comprising means for determining whether the mobile device is within the coverage area of the specified network based on the data indicative of location and coverage data for the specified network corresponding in type to the data indicative of location.

27. A system for detecting a wireless network, comprising:
   logic encoded in media; and
   the logic operable to receive at a mobile device in a macro network a signal having data indicative of a location of the mobile device, determine whether the mobile device is within a coverage area of a specified network based on the data and scan for the specified network in response to at least determining that the mobile device is within the coverage area of the specified network, wherein a decision as to whether to scan, by the mobile device, for the specified network is based on a distance between the location of the mobile device and a location of the specified network, determine if the specified network is available, continue scanning until the mobile device enters the specified network or until the mobile device exits the macro network; and camp on the specified network if signals are received from the specified network at a minimal signal strength, even if other signals are received from the macro network at a signal strength greater than the signals received from the specified network.

28. The system of claim 27, wherein the signal comprises a base station broadcast message having a base station identifier, the logic further operable to extract the base station identifier from the base station broadcast message, compare the base station identifier to a listing of base station identifiers for base stations at least proximate to the specified network and scan for the specified network in response to at least the base station identifier from the base station broadcast message matching one of the base station identifiers in the listing of base station identifiers.

29. The system of claim 28, wherein the base station identifiers for the specified network are stored in a network table at the mobile device.

30. The system of claim 27, wherein the signal comprises a base station broadcast message having a latitude and longitude of the base station, the logic further operable to extract the latitude and longitude from the base station broadcast message, compare a location based on the latitude and longitude to the coverage area of the specified network and scan for the specified network in response to at least the location being within the coverage area of the specified network.

31. The system of claim 30, wherein the coverage area is defined at the mobile device.

32. The system of claim 31, wherein the coverage area is defined by at least a center, a shape and dimensional information for the coverage area.

33. The system of claim 27, wherein the signal comprises a global positioning satellite (GPS) signal, the logic further operable to determine a location of the mobile device based on the GPS signal, compare the location of the mobile device to the coverage area of the specified network and scan for the specified network in response to at least the mobile device being within the coverage area of the specified network.

34. The system of claim 33, wherein the coverage area is defined at the mobile device.

35. The system of claim 34, wherein the coverage area is defined by at least a center, of the coverage area, a shape and dimensional information for the coverage area.

36. The system of claim 27, wherein the signal comprises a CDMA base station broadcast signal.

37. The system of claim 27, wherein the specified network comprises a preferred network for a user of the mobile device.

38. The system of claim 27, the logic further operable to camp onto the specified network if available.

39. The system of claim 27, the logic further operable to determine whether the mobile device is within the coverage area of the specified network based on the data indicative of location and coverage data for the specified network corresponding in type to the data indicative of locations.

40. A method for detecting a preferred wireless network while camped onto an overlying macro network, comprising:

receiving at a mobile device a base station broadcast message having a base station identifier;

extracting a base station identifier from the base station broadcast message;

determining whether the mobile device is within a coverage area of a preferred network by comparing the base station identifier to a listing of base station identifiers for base stations at least proximate to the preferred network stored in a network table at the mobile device, wherein the preferred network is overlapped by coverage from the macro network;

scanning for the preferred network in response to at least the base station identifier from the base station broadcast message matching one of the base station identifiers in the network table;

camping onto the preferred network if available, wherein a decision as to whether to scan, by the mobile device, for the preferred network is based on a distance between the location of the mobile device and a location of the preferred network;

determining if the preferred network is available;

continuing to scan until the mobile device enters the preferred network or until the mobile device exits the macro network; and camping on the preferred network if signals are received from the preferred network at a minimal signal strength, even if other signals are received from the macro network at a signal strength greater than the signals received from the preferred network.

41. The method of claim 40, wherein the base station identifier is for a base station of the specified network and the base station broadcast message is transmitted by a base station of a disparate network.

42. The method of claim 40, wherein the base station identifier is for base station of a disparate network and the base station broadcast message is transmitted by a base station of the disparate network.

43. The method of claim 40, wherein the base station identifier is for a base station of the specified network, the base station broadcast message is transmitted by a base station of a disparate network and the base station identifier is automatically updated by the base station of the disparate network based on radio discovery.

44. The method of claim 40, further comprising backing off scanning after each scan and termination scanning for the specified network after a specified number of tries.

45. The method of claim 40, further comprising terminating the scan upon leaving the coverage area.

46. The method of claim 40, further comprising:

receiving at the mobile device the base station broadcast message having the base station identifier and a network identifier;

extracting the network identifier from the base station broadcast message;

determining whether the mobile device is within the coverage area of the preferred network by comparing the network identifier to a stored network identifier for the preferred network; and scanning for the preferred network in response to at least a network identifier from the base station broadcast message matching the stored network identifier.

* * * * *